US012308549B2

(12) United States Patent
Shieh et al.

(10) Patent No.: US 12,308,549 B2
(45) Date of Patent: May 20, 2025

(54) POWER DEVICE

(71) Applicant: LITE-ON TECHNOLOGY CORPORATION, Taipei (TW)

(72) Inventors: Shuo-Jen Shieh, Taipei (TW); Chen-Yu Tsai, Taipei (TW); Yu-Po Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 352 days.

(21) Appl. No.: 18/113,007

(22) Filed: Feb. 22, 2023

(65) Prior Publication Data

US 2024/0006792 A1 Jan. 4, 2024

Related U.S. Application Data

(60) Provisional application No. 63/358,169, filed on Jul. 4, 2022.

(30) Foreign Application Priority Data

Oct. 25, 2022 (TW) ................................ 111140412

(51) Int. Cl.

| | |
|---|---|
| ***H01R 13/187*** | (2006.01) |
| ***H01R 13/502*** | (2006.01) |
| ***H01R 13/625*** | (2006.01) |
| ***H01R 24/76*** | (2011.01) |
| ***H01R 31/06*** | (2006.01) |
| ***H01R 103/00*** | (2006.01) |

(52) U.S. Cl.
CPC ......... *H01R 13/187* (2013.01); *H01R 13/625* (2013.01); *H01R 24/76* (2013.01); *H01R 31/06* (2013.01); *H01R 13/502* (2013.01); *H01R 2103/00* (2013.01)

(58) Field of Classification Search
CPC .... H01R 13/187; H01R 13/625; H01R 24/76; H01R 31/06; H01R 13/502; H01R 2103/00; H01R 24/70
See application file for complete search history.

(56) References Cited

U.S. PATENT DOCUMENTS

| | | | | |
|---|---|---|---|---|
| 6,062,884 A * | 5/2000 | Messimer | ............. | H01R 31/06 439/131 |
| 8,272,899 B2 * | 9/2012 | Youssefi-Shams | .... | H01R 13/71 439/628 |

* cited by examiner

*Primary Examiner* — Briggitte R. Hammond
(74) *Attorney, Agent, or Firm* — Innovation Counsel LLP

(57) ABSTRACT

A power device is provided. The power device includes a body and a plug rotatably assembled on the body. The body includes a lower housing and a connection element in the lower housing. The connection element includes a pathway and a conductive pin at least partially disposed in the pathway. The plug includes an upper housing and an upper pin rotatably and pivotally connected to the upper housing. The upper pin is used to electrically connect to an external power supply. The plug rotates relative to the body to move the conductive pin along the pathway from a storage position to an extending position to electrically connect to the upper pin.

10 Claims, 12 Drawing Sheets

10

POWER DEVICE

This application claims the benefit of U.S. provisional application Ser. No. 63/358,169, filed Jul. 4, 2022, and Taiwan application Serial No. 111140412, filed Oct. 25, 2022, the subject matters of which are incorporated herein by reference.

BACKGROUND

Technical Field

The disclosure relates to a power device, and more particularly to a power device including a retractable conductive pin.

Description of the Related Art

Existing power devices generally include a plug and a body, the plug is assembled on the body, and the body includes conductive pins for contacting the plug and conducting current. However, the conductive pins of the existing power devices protrude from the surface of the body and most of them are exposed outside. Such a design makes the conductive pins easy to rust, deform or crack, resulting in a reduction in the electrical connection quality and service life of the power devices.

SUMMARY

The present disclosure relates to a power device including a retractable conductive pin, which can solve the problems of rust, deformation or cracking of conductive pins.

According to an embodiment of the present disclosure, a power device is provided. The power device includes a body and a plug rotatably assembled on the body. The body includes a lower housing and a connection element in the lower housing. The connection element includes a pathway and a conductive pin at least partially disposed in the pathway. The plug includes an upper housing and an upper pin rotatably and pivotally connected to the upper housing. The upper pin is used to electrically connect to an external power supply. The plug rotates relative to the body to move the conductive pin along the pathway from a storage position to an extending position to electrically connect to the upper pin.

According to an embodiment of the present disclosure, a power device is provided. The power device includes a body and a plug rotatably assembled on the body. The body includes a lower housing, a circuit board and a conductive pin. The circuit board is disposed in the lower housing. The conductive pin is movably disposed in the lower housing. The conductive pin is movable between a storage position and an extending position. The plug includes an upper housing and an upper pin. The upper pin is rotatably and pivotally connected to the upper housing. The upper pin is used to electrically connect to an external power supply. The conductive pin at the storage position is electrically isolated from the upper pin. The upper pin is electrically connected to the circuit board through the conductive pin at the extending position.

The above and other embodiments of the disclosure will become better understood with regard to the following detailed description of the non-limiting embodiment(s). The following description is made with reference to the accompanying drawings.

DETAILED DESCRIPTION

Figure 1A:
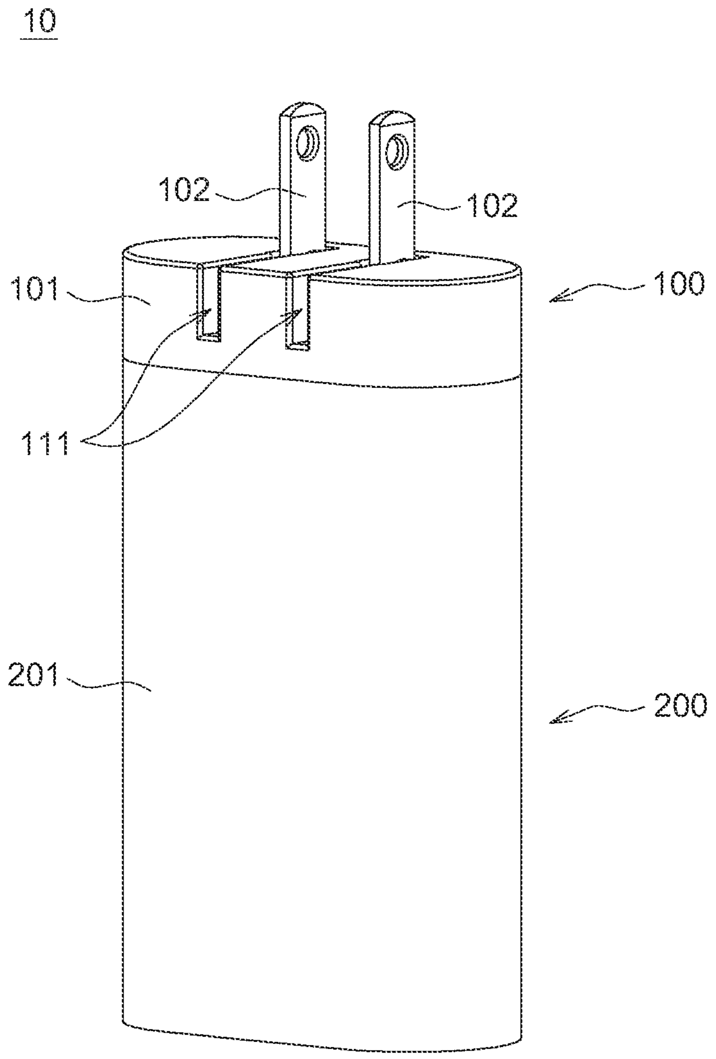
FIG. 1A illustrates a schematic view of a power device according to an embodiment of the present disclosure.

Various embodiments will be described more fully hereinafter with reference to accompanying drawings, which are provided for illustrative and explaining purposes rather than a limiting purpose. For clarity, the components may not be drawn to scale. In addition, some components and/or reference numerals may be omitted from some drawings. It is contemplated that the elements and features of one embodiment can be beneficially incorporated in another embodiment without further recitation.

Figure 1B:
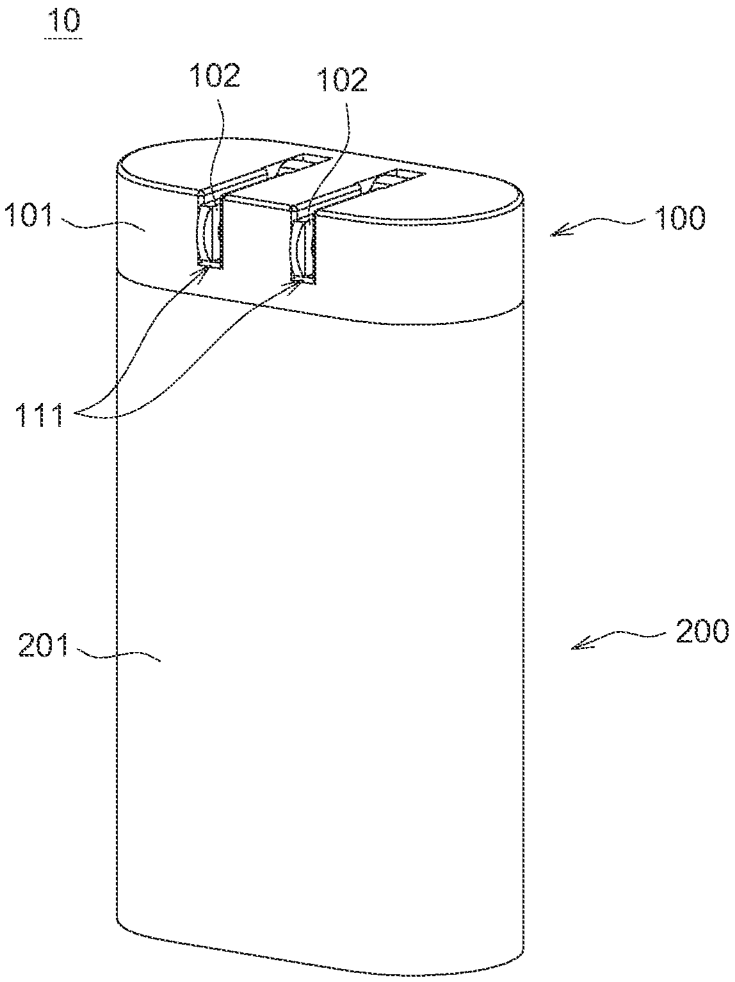
FIG. 1B illustrates a schematic view of a power device according to an embodiment of the present disclosure.

Referring to FIGS. 1A-1B, FIG. 1A illustrates a schematic view of a power device 10 according to an embodiment of the present disclosure, and FIG. 1B illustrates a schematic view of the power device 10 according to an embodiment of the present disclosure. The power device 10 includes a plug 100 and a body 200. The plug 100 is rotatably assembled on the body 200. The plug 100 is replaceable. The plug 100 may rotate relative to the body 200.

Figure 2A:
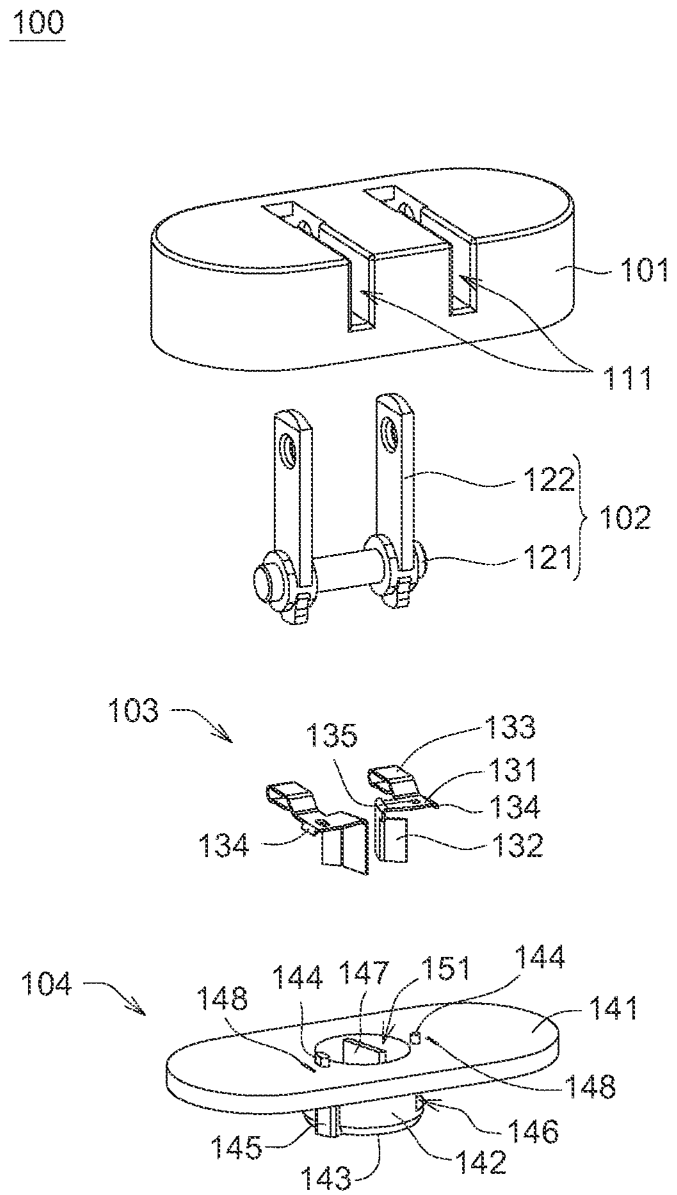
FIG. 2A illustrates an exploded view of a plug according to an embodiment of the present disclosure.
Figure 2B:
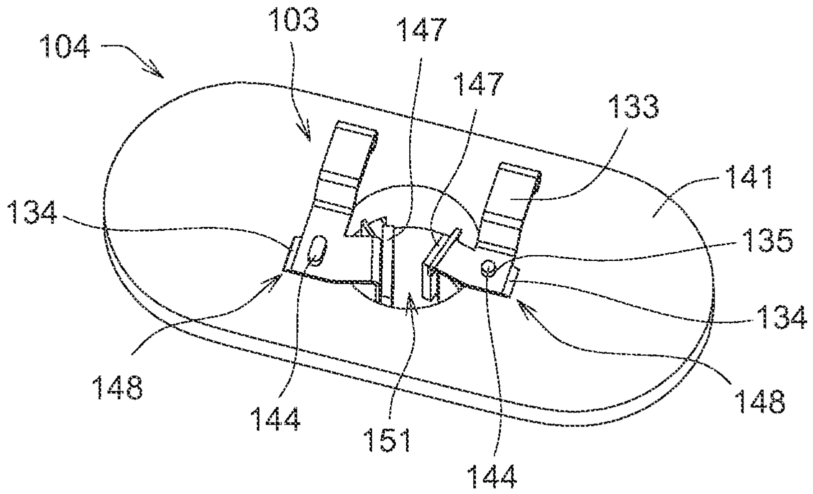
FIG. 2B illustrates a schematic view of assembled conductive member and mounting plate of the plug of FIG. 2A.
Figure 2C:
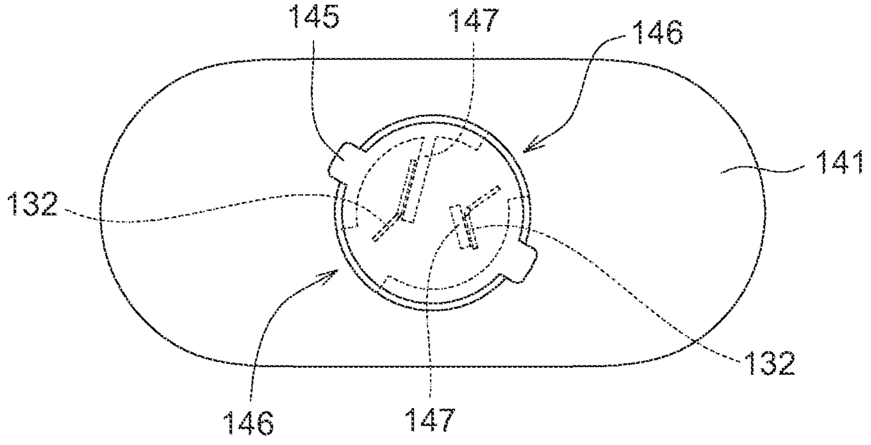
FIG. 2C illustrates a schematic view of assembled conductive member and mounting plate of the plug of FIG. 2A.

Referring to FIGS. 2A-2C, FIG. 2A illustrates an exploded view of the plug 100 according to an embodiment of the present disclosure, FIG. 2B illustrates a schematic view of assembled conductive member 103 and mounting plate 104 of the plug 100 of FIG. 2A, and FIG. 2C illustrates the bottom of the mounting plate 104 of FIG. 2B including assembled conductive member 103. The plug 100 includes an upper housing 101, an upper pin 102, the conductive members 103 and the mounting plate 104. The upper housing 101 includes grooves 111 corresponding to the upper pin 102. The upper pin 102 is rotatably and pivotally connected to the upper housing 101. The upper pin 102 includes a shaft part 121 which can be rotatably and pivotally connected to the grooves 111, and terminals 122 connected to the shaft part 121. The upper pin 102 may rotate between a pull-out position and a folded position. When the upper pin 102 is at the pull-out position, the terminals 122 of the upper pin 102 protrude out of the groove 111 (as shown in FIG. 1A). When the upper pin 102 is at the folded position, the terminals 122 of the upper pin 102 are in the grooves 111 (as shown in FIG. 1B). The upper pin 102 can contact a matched socket so that the power device 10 can be electrically connected to an external power supply. For example, the external power supply may be an AC power supply.

The conductive member 103 may be a metal elastic element, a column or other conductors. In this embodiment, the conductive member 103 is an elastic element. The conductive member 103 includes a base piece 131, a first extending piece 132 connected to the base piece 131 and extending downward from an inner side of the base piece 131, a second extending piece 133 connected to the base piece 131 and extending backward from a rear side of the base piece 131, a fixed piece 134 connected to the base piece 131 and extending downward from an outer side of the base piece 131 and an opening 135 disposed on the base piece 131. The rear side of the base piece 131 is adjacent to the inner side and the outer side of the base piece 131. The inner side of the base piece 131 is opposite to the outer side of the base piece 131. The second extending piece 133 may be bent relative to the base piece 131. The mounting plate 104 includes a board 141, a side board 142, a bottom board 143, limit components 144, positioning bumps 145, through-holes 146, partition walls 147 and limit slits 148. This embodiment is illustrated by taking two limit components 144, two positioning bumps 145, two through-holes 146, two partition walls 147 and two limit slits 148 as examples, but the present disclosure is not limited thereto. The number of limit components, positioning bumps, through-holes, partition walls and limit slits can be adjusted as required. The side board 142 is disposed on the board 141 and extending downward from the board 141. The bottom board 143 is connected to the side board 142. The side board 142 and the bottom board 143 define a recess 151. The positioning bumps 145 are disposed on the outer surface of the side board 142. Two positioning bumps 145 may be arranged approximately symmetrically. The through-holes 146 penetrate the side board 142 and communicate with the recess 151. Two through-holes 146 arranged approximately symmetrically. The partition walls 147 are disposed on the base board 143 and in the recess 151. The partition walls 147 may be separated from each other. The limit components 144 are disposed on the board 141 and protruding upward from the board 141. The limit components 144 may be the identical or different from each other. Two limit components 144 correspond to different openings 135 respectively. The limit slits 148 are disposed on the board 141 and recessed downward relative to the board 141. Two limit slits 148 correspond to different fixed pieces 134 respectively.

As shown in FIGS. 2B-2C, the limit component 144 passes through the corresponding opening 135; the fixed piece 134 may be inserted into the corresponding limit slit 148 to limit the movement of the conductive member 103 in the horizontal direction and fix the conductive member 103 to the mounting plate 104. The base piece 131 is at least partially disposed on the board 141. The first extending piece 132 is at least partially disposed in the recess 151. Two first extending pieces 132 may abut against different partition walls 147 respectively. The partition wall 147 may be used to electrically insulate two conductive members 103 from each other. The second extending piece 133 is disposed on the board 141.

Figure 3A:
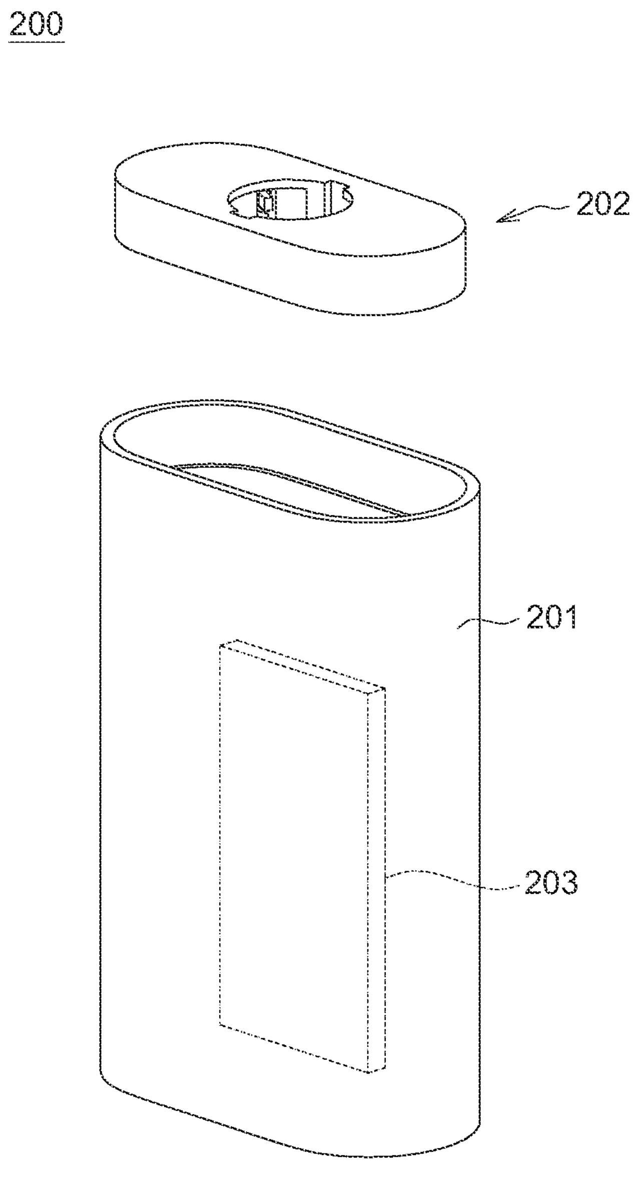
FIG. 3A illustrates an exploded view of a body according to an embodiment of the present disclosure.
Figure 3B:
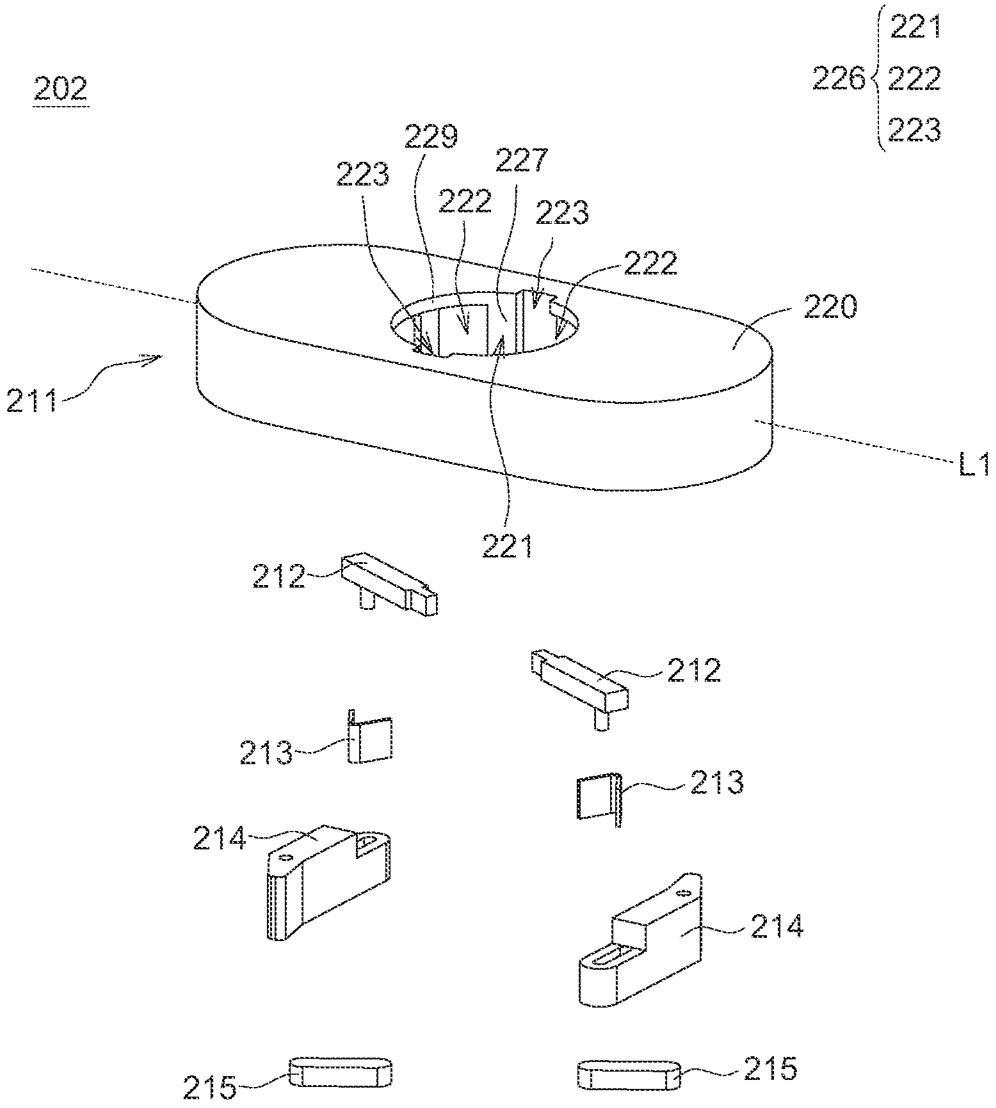
FIG. 3B illustrates an exploded view of a connection element according to an embodiment of the present disclosure.
Figure 3C:
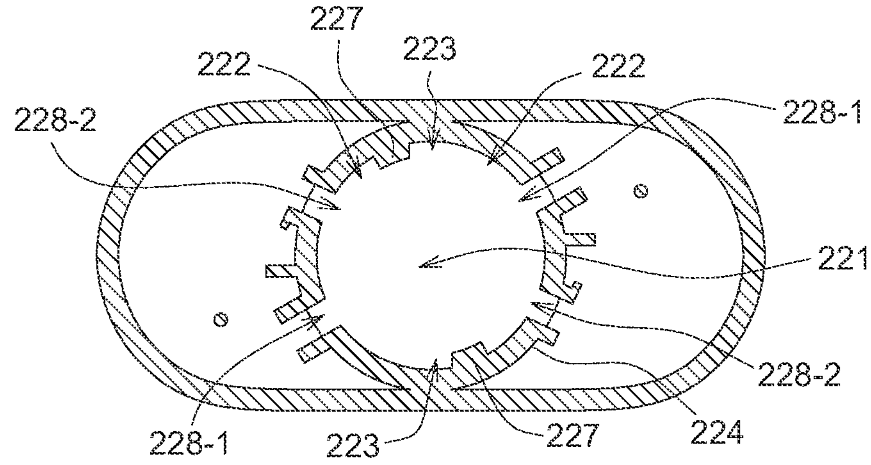
FIG. 3C is a schematic sectional view of the base illustrated along an extending line L1 in FIG. 3B according to an embodiment of the present disclosure.
Figure 3D:
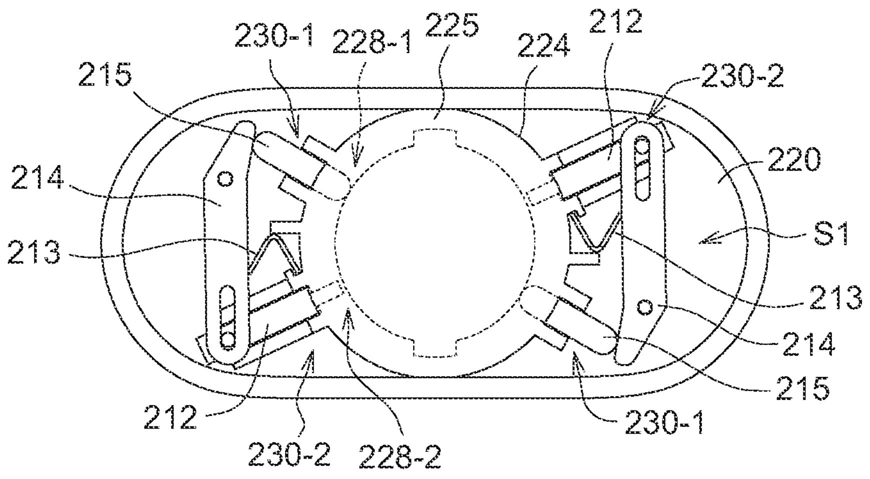
FIG. 3D illustrates a schematic view of an assembled connection element according to an embodiment of the present disclosure.

Referring to FIGS. 3A-3D, FIG. 3A illustrates an exploded view of the body 200 according to an embodiment of the present disclosure, FIG. 3B illustrates an exploded view of a connection element 202 according to an embodiment of the present disclosure, FIG. 3C is a schematic sectional view of the base 211 illustrated along an extending line L1 in FIG. 3B, and FIG. 3D illustrates a schematic view of the assembled connection element 202 according to an embodiment of the present disclosure. The body 200 includes a lower housing 201, the connection element 202 in the lower housing 201 and a circuit board 203 in the lower housing 201. The upper housing 101 is assembled on the lower housing 201. The connection element 202 includes the base 211, conductive pins 212 movably disposed on the base 211, elastic members 213, linking rods 214 movably disposed on the base 211, and levers 215 movably disposed on the base 211. This embodiment is illustrated by taking two conductive pins 212, two elastic members 213, two linking rods 214 and two levers 215 as examples, but the present disclosure is not limited thereto. The number of conductive pins, elastic members, linking rods and levers can be adjusted as required.

The base 211 includes a base plate 220, a base side plate 224 and a base bottom plate 225, and the base side plate 224 and the base bottom plate 225 are shown in FIG. 3D. The base side plate 224 is disposed on the base plate 220 and extends downward relative to the base plate 220. The base bottom plate 225 connects the base side plate 224. The base side plate 224 and the base bottom plate 225 define an assembly part 226. The assembly part 226 includes an assembly area 221, arc-shaped assembly channels 222 and positioning grooves 223. The arc-shaped assembly channels 222 are disposed along the base side plate 224. The arc-shaped assembly channels 222 may be between the assembly area 221 and the base side plate 224. The assembly area 221 communicates with the arc-shaped assembly channels 222 and the positioning grooves 223. One of the arc-shaped assembly channels 222 communicates with one of the positioning grooves 223, and the other one of the arc-shaped assembly channels 222 communicates with the other one of the positioning grooves 223. The positioning grooves 223 may be arranged approximately symmetrically. The base 211 may further include blocking blocks 227 disposed on the base side plate 224 and in the assembly part 226, limit member 229 disposed at the opening of the assembly part 226, and penetration holes 228-1~228-2. The blocking blocks 227 may be located at the ends of the arc-shaped assembly channels 222 respectively. The limit member 229 may have an arc shape. The limit member 229 may be disposed along the periphery of the opening of the assembly part 226. The limit member 229 may protrude toward the inside of the assembly part 226. The limit member 229 may protrude toward the assembly area 221. The limit member 229 may overlap the arc-shaped assembly channels 222 in the vertical direction. The limit member 229 does not overlap the positioning grooves 223 in the vertical direction. The penetration holes 228-1~228-2 penetrate the base side plate 224 and communicate with the assembly part 226.

As shown in FIG. 3D, the base 211 may further include pathways 230-1~230-2 on the lower surface S1 of the base plate 220. The pathway 230-1 connects the penetration hole 228-1. The pathway 230-2 connects the penetration hole 228-2. The conductive pins 212, elastic members 213, linking rods 214 and levers 215 are disposed on the lower surface S1 of the base plate 220. The linking rod 214 is pivotally connected to the conductive pin 212. The lever 215 abuts the linking rod 214. The elastic member 213 abuts between the linking rod 214 and the base side plate 224. For example, the elastic member 213 may be an elastic piece or a spring. In this embodiment, the elastic member 213 is a V-shaped elastic piece. In this embodiment, two levers 215 are at least partially disposed in two pathways 230-1 respectively and at least partially disposed in two penetration holes 228-1 respectively. In this embodiment, two conductive pins 212 are at least partially disposed in two pathways 230-2 respectively and at least partially disposed in two penetration holes 228-2 respectively.

Figure 4:
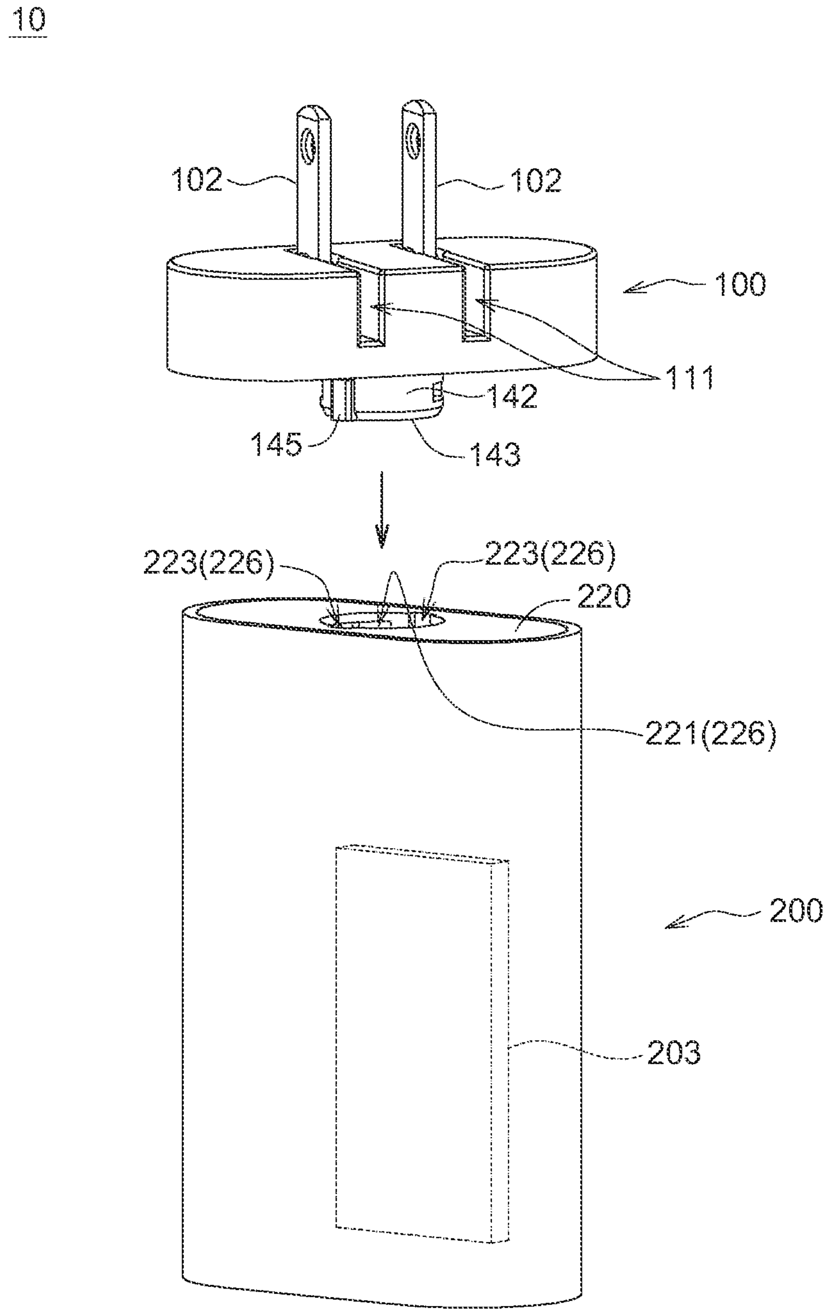
FIG. 4 illustrates a schematic view of a power device before assembly according to an embodiment of the present disclosure.
Figure 5A:
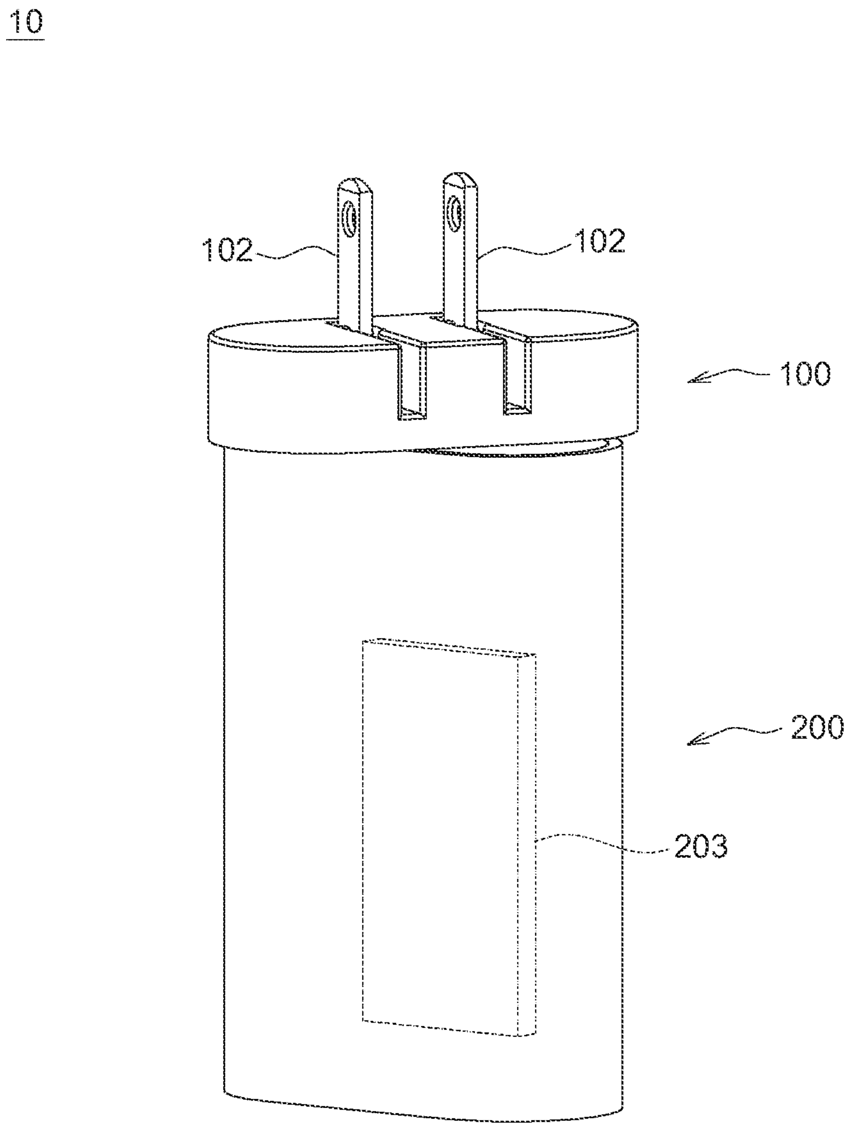
FIG. 5A illustrates a schematic view of a power device during assembly according to an embodiment of the present disclosure.
Figure 5B:
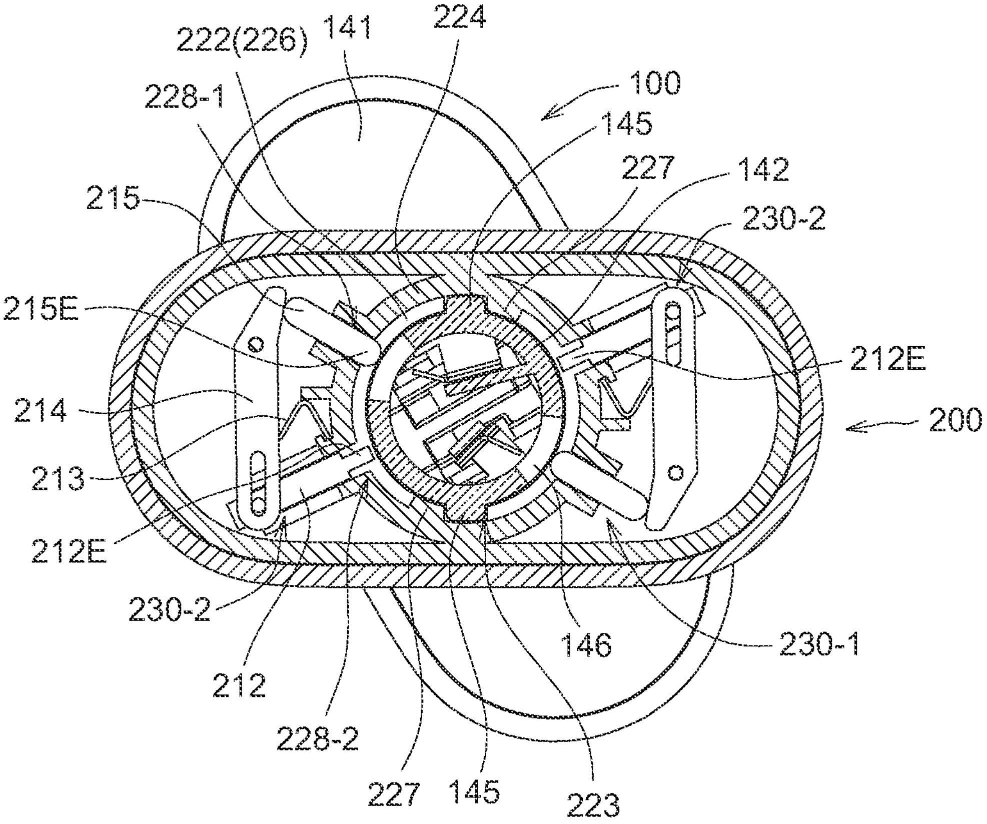
FIG. 5B illustrates a schematic perspective view of the power device during assembly of FIG. 5A.
Figure 6A:
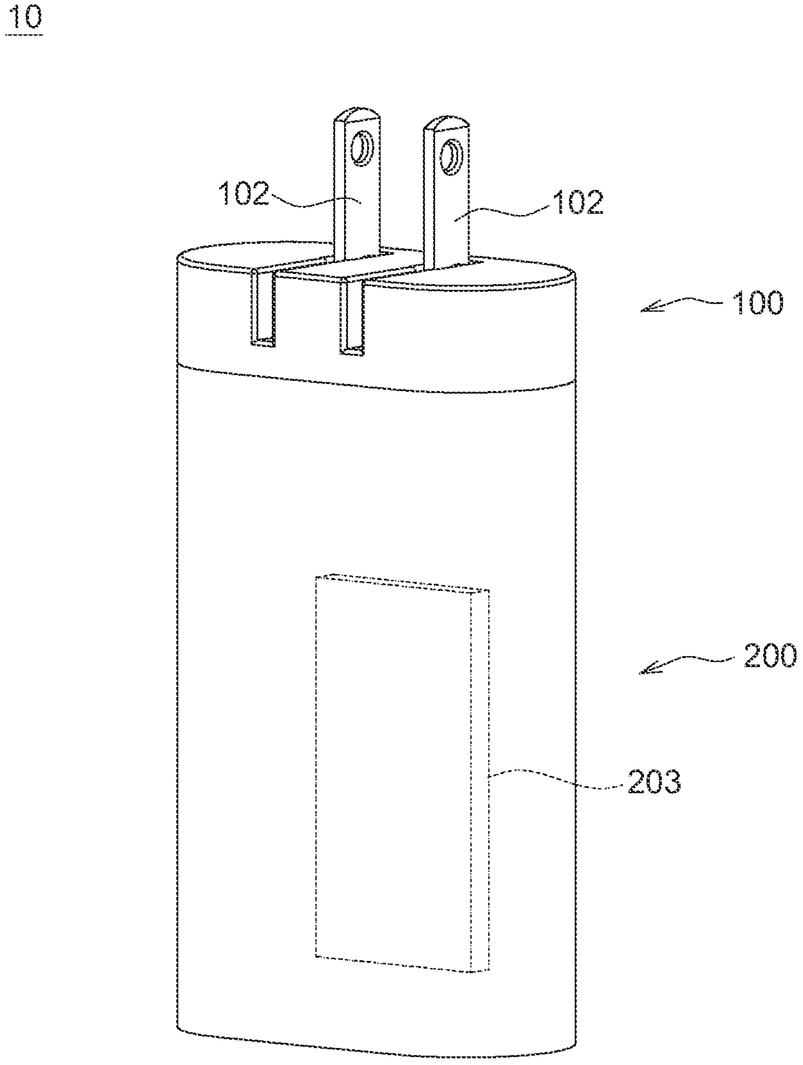
FIG. 6A illustrates a schematic view of an assembled power device according to an embodiment of the present disclosure.
Figure 6B:
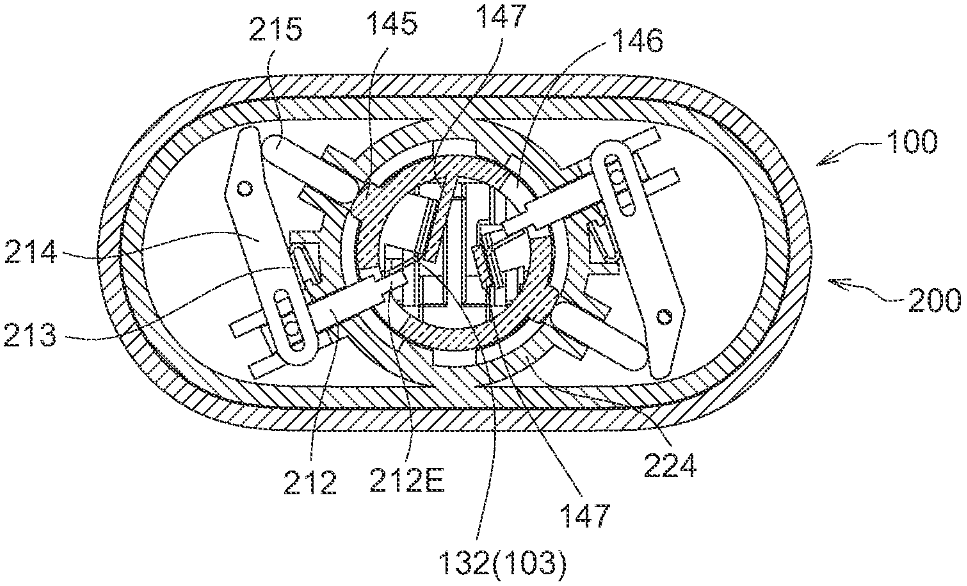
FIG. 6B illustrates a schematic perspective view of the assembled power device of FIG. 6A.

The assembling process of the power device 10 of the present disclosure is described below with reference to FIGS. 4-6B. FIG. 4 illustrates a schematic view of the power device 10 before assembly according to an embodiment of the present disclosure. FIG. 5A illustrates a schematic view of the power device 10 during assembly according to an embodiment of the present disclosure. FIG. 5B illustrates a schematic perspective view of the power device 10 during assembly of FIG. 5A, obtained from bottom to top. FIG. 6A illustrates a schematic view of the assembled power device 10 according to an embodiment of the present disclosure. FIG. 6B illustrates a schematic perspective view of the assembled power device 10 of FIG. 6A, obtained from bottom to top. In order to facilitate the understanding of the functional relationship between components during the assembly process of the power device, the lower housing 201, the circuit board 203, the base bottom plate 225 and the bottom board 143 are omitted in FIG. 5B and FIG. 6B. In the assembling process of the power device 10 shown in FIGS. 4-6B, the terminals 122 of the upper pin 102 protrude out of the groove 111 (i.e. the upper pin 102 is at the pull-out position), but the present disclosure is not limited thereto. The assembly process of the power device 10 may be performed while the terminals 122 of the upper pin 102 are in the grooves 111 (i.e. the upper pin 102 is at the folded position). Alternatively, the upper pin 102 may be switched between the pull-out position and the folded position during the assembly process.

The positioning bumps 145 of the plug 100 are roughly aligned with the positioning grooves 223. Then, the plug 100 is moved toward the body 200 (for example, along the direction of the arrow in FIG. 4) so that a part of the plug is located in the assembly part 226 and the plug 100 is on the body 200, as shown in FIG. 5A. At this time, the plug 100 is at a first position relative to the body 200. As shown in FIGS. 5A-5B, the plug 100 and the body 200 intersect when the plug 100 is at the first position. The side board 142 and the bottom board 143 of the plug 100 are in the assembly area 221 of the assembly part 226. The positioning bumps 145 are located in the positioning grooves 223 of the assembly part 226. The board 141 (shown in FIGS. 2A-2B) of the plug 100 may be on the base plate 220 of the body 200. The lever 215 is at least partially disposed in the pathway 230-1 and at least partially disposed in the penetration hole 228-1, and a front end 215E of the lever 215 protrudes from the base side plate 224 and is located in the arc-shaped assembly channel 222 of the assembly part 226. The conductive pin 212 are at least partially disposed in the pathway 230-2 and at least partially disposed in the penetration hole 228-2. At this time, the conductive pin 212 is at a storage position. The elastic member 213 support the linking rod 214 so that the conductive pin 212 can be maintained at the storage position. When the conductive pin 212 is at the storage position, the conductive pin 212 is electrically isolated from the upper pin 102. In an embodiment, when the conductive pin 212 is at the storage position, a front end 212E of the conductive pin 212 protrudes slightly from the base side plate 224 and the conductive pin 212 does not contact the plug 100. In other embodiments, when the conductive pin 212 is at the storage position, the front end 212E of the conductive pin 212 can be completely accommodated in the penetration hole 228-2, the front end 212E of the conductive pin 212 does not protrude from the base side plate 224, and the conductive pin 212 does not contact the plug 100.

Then, the plug 100 is rotated relative to the body 200. In an embodiment, the plug may be rotated relative to the body 200 by an angle that is not greater than 90 degrees, such as an angle not greater than 60±10 degrees. The blocking blocks 227 limit the rotation direction of the plug 100, so that the plug 100 may only rotate counterclockwise in FIG. 5B. During the rotation of the plug 100, the positioning bump 145 of the plug 100 slides from the corresponding positioning groove 223 into the arc-shaped assembly channel 222 communicating with the corresponding positioning groove 223. When the positioning bump 145 of the plug 100 is in the arc-shaped assembly channel 222, the limit member 229 (shown in FIG. 3B) may limit the movement of the plug 100 in the vertical direction. During the rotation of the plug 100 along the arc-shaped assembly channel 222, the positioning bump 145 contacts the lever 215 and pushes the lever 215 outward, the lever 215 drives the conductive pin 212 through the linking rod 214, and the conductive pin 212 moves toward the side board 142 of the plug 100 along the pathway 230-2.

The plug may be rotated to a second position relative to the body 200, as shown in FIGS. 6A-6B. When the plug 100 is at the second position, the through-hole 146 of the plug 100 is roughly aligned with the conductive pin 212, the front end 212E of the conductive pin 212 protrudes from the base side plate 224, the conductive pin 212 passes through the through-hole 146, the front end 212E of the conductive pin 212 contacts the first extending piece 132 of the conductive member 103 of the plug 100, and the plug 100 is electrically connected to the body 200. At this time, the conductive pin 212 is at an extending position. The upper pin 102 of the plug is electrically connected to the circuit board 203 through the conductive member 103 and the conductive pin 212. The current from the external power supply can flow to the electrical product or battery connected to the power device 10 via the upper pin 102, the conductive member 103, the conductive pin 212, and the circuit board 203. When the plug 100 is at the second position, the linking rod 214 applies a force toward the plug 100 to the elastic member 213 so that the elastic member 213 deforms. In an embodiment, when the plug 100 is at the second position, the plug 100 is aligned with the body 200. In an embodiment, when the plug 100 is at the second position, the plug 100 is fastened to the body 200, and the movements of the plug 100 in the horizontal direction and vertical direction are restricted. The plug 100 can be any type of plug of, for example, the plug 100 can be a US plug, a UK plug, an EU plug, an Australia plug, a Japan plug, a China plug or a South Korea plug. In other words, these different types of plugs may be applicable to the conductive pin 212 of the present disclosure. The upper pins 102 of different types of plugs 100 can be electrically connected to the circuit board 203 through the conductive member 103 and the conductive pin 212. Therefore, the manufacturing cost of the power device 10 can be effectively reduced and the power device is convenient.

Through the steps described above, the plug 100 has been assembled to the body 200, and the assembly of the power device 10 is completed.

In an embodiment, the plug 100 can be rotated from the second position to the first position for removal or replacement of the plug 100. When the plug 100 moves from the second position to the first position, the positioning bump 145 does not exert a force on the lever, the elastic member 213 recovers from the deformed state, and the conductive pin 212 automatically returns to the storage position.

The present disclosure provides a power device including a movable conductive pin. The conductive pin is at storage position when the plug is not assembled on the body. The conductive pin is at the extending position to provide an electrically connection when the assembly of the power device is completed. With such configuration, the exposed area of the conductive pin can be reduced, or the exposed conductive pin can be avoided. As such, the problem that the conductive pins are easy to rust, deform or crack can be solved, and the electrical connection quality and service life of the power devices can be improved. Moreover, the conductive pin of the present disclosure can be applied to various types of plugs, which can reduce the manufacturing cost of the power device and is convenient for users to use in various countries in the world.

It is noted that the structures and methods as described above are provided for illustration. The disclosure is not limited to the configurations and procedures disclosed above. Other embodiments with different configurations of known elements can be applicable, and the exemplified structures could be adjusted and changed based on the actual needs of the practical applications. It is, of course, noted that the configurations of figures are depicted only for demonstration, not for limitation. Thus, it is known by people skilled in the art that the related elements and layers in a semiconductor structure, the shapes or positional relationship of the elements and the procedure details could be adjusted or changed according to the actual requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power device, comprising:

a body comprising a lower housing and a connection element in the lower housing, wherein the connection element comprises a pathway and a conductive pin at least partially disposed in the pathway; and a plug rotatably assembled on the body and comprising an upper housing and an upper pin, wherein the upper pin is rotatably and pivotally connected to the upper housing, the upper pin is used to electrically connect to an external power supply, wherein the plug rotates relative to the body to move the conductive pin along the pathway from a storage position to an extending position to electrically connect to the upper pin.

2. The power device according to claim 1, wherein the plug rotates between a first position relative to the body and a second position relative to the body, the conductive pin is at the storage position and does not contact the plug while the plug is at the first position, the conductive pin is at the extending position and contacts the plug while the plug is at the second position.

3. The power device according to claim 2, wherein the connection element comprises a lever and a linking rod, the lever abuts the linking rod, the linking rod is pivotally connected to the conductive pin, the plug rotates relative to the body so that the plug contacts the lever of the connection element, the lever pushes the conductive pin though the linking rod, and the conductive pin moves from the storage position to the extending position.

4. The power device according to claim 3, wherein the connection element comprises a base plate, a base side plate and a base bottom plate, the base side plate is disposed on the base plate and extends downward relative to the base plate, the base bottom plate connects the base side plate to define an assembly part, a part of the plug is located in the assembly part, a front end of the lever protrudes from the base side plate and is located in the assembly part while the plug is at the first position.

5. The power device according to claim 3, wherein the connection element comprises an elastic piece, the linking rod deforms the elastic piece while the plug is at the second position relative to the body.

6. The power device according to claim 5, wherein the linking rod applies a force toward the plug to the elastic piece while the plug is at the second position relative to the body.

7. The power device according to claim 3, wherein the plug comprises a through-hole, the conductive pin passes through the through-hole of the plug while the plug is at the second position.

8. A power device, comprising:

a body comprising a lower housing, a circuit board and a conductive pin, wherein the circuit board is disposed in the lower housing, the conductive pin is movably disposed in the lower housing, the conductive pin is movable between a storage position and an extending position; and a plug rotatably assembled on the body and comprising an upper housing and an upper pin, wherein the upper pin is rotatably and pivotally connected to the upper housing, the upper pin is used to electrically connect to an external power supply, wherein the conductive pin at the storage position is electrically isolated from the upper pin, and the upper pin is electrically connected to the circuit board through the conductive pin at the extending position.

9. The power device according to claim 8, wherein the plug rotates relative to the body to move the conductive pin from the storage position to the extending position.

10. The power device according to claim 8, wherein the body comprises a lever and a linking rod movably disposed in the lower housing, the lever abuts the linking rod, the linking rod is pivotally connected to the conductive pin, the plug contact the lever so as to move the conductive pin from the storage position to the extending position through the linking rod.

* * * * *